(12) United States Patent
IJntema et al.

(10) Patent No.: US 12,250,121 B2
(45) Date of Patent: Mar. 11, 2025

(54) MANAGING RESOURCE UTILIZATION BY MULTIPLE NETWORK SLICES

(71) Applicants: Koninklijke KPN N.V., Rotterdam (NL); Nederlandse Organisatie Voor Toegepast-Natuurwetenschappelijk Onderzoek TNO, 'S-Gravenhage (NL)

(72) Inventors: Wieger IJntema, Rotterdam (NL); Pieter Nooren, Delft (NL); Sjors Braam, Utrecht (NL)

(73) Assignees: Koninklijke KPN N.V., Rotterdam (NL); Nederlandse Organisatie Voor Toegepast-Natuurwetenschappelijk Onderzoek TNO, 's-Gravenhage (NL)

( * ) Notice: Subject to any disclaimer, the term of this patent is extended or adjusted under 35 U.S.C. 154(b) by 0 days.

(21) Appl. No.: 17/785,319

(22) PCT Filed: Dec. 21, 2020

(86) PCT No.: PCT/EP2020/087392
§ 371 (c)(1),
(2) Date: Jun. 14, 2022

(87) PCT Pub. No.: WO2021/123411
PCT Pub. Date: Jun. 24, 2021

(65) Prior Publication Data
US 2023/0031777 A1 Feb. 2, 2023

(30) Foreign Application Priority Data

Dec. 21, 2019 (EP) .................................... 19219178

(51) Int. Cl.
*H04W 16/04* (2009.01)
*H04L 41/0823* (2022.01)
(Continued)

(52) U.S. Cl.
CPC ...... *H04L 41/0895* (2022.05); *H04L 41/0823* (2013.01); *H04L 43/0876* (2013.01);
(Continued)

(58) Field of Classification Search
CPC ............. H04L 41/0895; H04L 41/0823; H04L 43/0876; H04W 16/04; H04W 28/02; H04W 28/0284
See application file for complete search history.

(56) References Cited

U.S. PATENT DOCUMENTS 9,497,136 B1 11/2016 Ramarao et al.
10,361,843 B1 7/2019 Suthar et al.
(Continued)

FOREIGN PATENT DOCUMENTS

CN 101547150 A 9/2009
CN 106922002 A 7/2017
(Continued)

OTHER PUBLICATIONS

International Search Report and Written Opinion received for PCT Patent Application No. PCT/EP2020/087392, mailed on Feb. 3, 2021, 10 pages.
(Continued)

*Primary Examiner* — Shirley X Zhang
(74) *Attorney, Agent, or Firm* — Hamilton, Brook, Smith & Reynolds, P.C.

(57) ABSTRACT

Next generation network architectures enable instantiation of network slices in which traffic may be transported via one or more virtual networks overlaying the physical network infrastructure. Multiple of such network slices may share a resource of a particular network function, such as a bandwidth, switching capacity, computing capacity and/or storage capacity of the network function. It may be desirable to provide guarantees on the minimum resource availability of
(Continued)

the shared resource per network slice. Accordingly, a slice resource distribution function (SRDF) may be provided which may be configured manage the resource utilization of the shared resource which may safeguard guarantees on the minimum resource availability per network slice.

15 Claims, 8 Drawing Sheets

(51) Int. Cl.
  *H04L 41/0895* (2022.01)
  *H04L 43/0876* (2022.01)
  *H04W 28/02* (2009.01)

(52) U.S. Cl.
  CPC ........... *H04W 16/04* (2013.01); *H04W 28/02* (2013.01); *H04W 28/0284* (2013.01)

(56) References Cited

U.S. PATENT DOCUMENTS

| | | | |
|---|---|---|---|
| 10,440,642 | B2 | 10/2019 | Zait |
| 10,506,489 | B2 | 12/2019 | Vrzic |
| 10,644,955 | B2 | 5/2020 | Zhang et al. |
| 10,986,540 | B2 | 4/2021 | Bor et al. |
| 11,051,210 | B2 | 6/2021 | Sciancalepore et al. |
| 11,470,620 | B2 | 10/2022 | Ijntema et al. |
| 11,916,734 | B2 | 2/2024 | D'Acunto et al. |
| 2011/0249685 | A1 | 10/2011 | Liang et al. |
| 2013/0339495 | A1 | 12/2013 | Mower et al. |
| 2016/0352924 | A1 | 12/2016 | Senarath et al. |
| 2016/0353367 | A1 | 12/2016 | Vrzic et al. |
| 2016/0353465 | A1 | 12/2016 | Vrzic et al. |
| 2017/0086118 | A1 | 3/2017 | Vrzic |
| 2017/0208019 | A1* | 7/2017 | Shimojou ........... H04L 41/0897 |
| 2017/0366399 | A1 | 12/2017 | Li et al. |
| 2018/0013680 | A1* | 1/2018 | Bull ................ H04W 72/1268 |
| 2018/0077024 | A1* | 3/2018 | Zhang ................ H04L 41/0896 |
| 2018/0123878 | A1* | 5/2018 | Li ........................... H04L 41/40 |
| 2018/0131578 | A1 | 5/2018 | Cui et al. |
| 2018/0132117 | A1 | 5/2018 | Senarath et al. |
| 2018/0132138 | A1 | 5/2018 | Senarath et al. |
| 2018/0139129 | A1 | 5/2018 | Dowlatkhah et al. |
| 2018/0199279 | A1 | 7/2018 | Baek et al. |
| 2018/0220276 | A1 | 8/2018 | Senarath et al. |
| 2018/0260200 | A1 | 9/2018 | Karagiannis et al. |
| 2018/0316627 | A1 | 11/2018 | Cui et al. |
| 2019/0089780 | A1 | 3/2019 | Yousaf et al. |
| 2019/0109768 | A1 | 4/2019 | Senarath et al. |
| 2019/0174320 | A1 | 6/2019 | Kodaypak et al. |
| 2019/0174322 | A1 | 6/2019 | Deviprasad et al. |
| 2019/0174347 | A1 | 6/2019 | Dowlatkhah et al. |
| 2019/0174449 | A1 | 6/2019 | Shan et al. |
| 2019/0182876 | A1 | 6/2019 | Ying et al. |
| 2019/0342761 | A1 | 11/2019 | Yu et al. |
| 2019/0357129 | A1 | 11/2019 | Park et al. |
| 2019/0357130 | A1 | 11/2019 | Garcia et al. |
| 2020/0044909 | A1 | 2/2020 | Huang et al. |
| 2020/0045548 | A1 | 2/2020 | Dowlatkhah et al. |
| 2020/0053083 | A1 | 2/2020 | Kunz et al. |
| 2020/0154292 | A1* | 5/2020 | Bor-Yaliniz .......... H04W 28/08 |
| 2021/0067421 | A1* | 3/2021 | Kidd ...................... H04L 49/101 |
| 2021/0345357 | A1* | 11/2021 | Ijntema ................ H04L 47/781 |
| 2021/0392040 | A1 | 12/2021 | Kerboeuf et al. |
| 2022/0158903 | A1 | 5/2022 | D'Acunto et al. |
| 2022/0239568 | A1 | 7/2022 | Celozzi et al. |
| 2022/0256439 | A1 | 8/2022 | Casati et al. |
| 2022/0338151 | A1 | 10/2022 | Tang |
| 2022/0394396 | A1 | 12/2022 | Gallgo |
| 2022/0417758 | A1 | 12/2022 | Nooren et al. |
| 2023/0006884 | A1 | 1/2023 | IJntema et al. |
| 2023/0007662 | A1 | 1/2023 | IJntema et al. |
| 2023/0217362 | A1 | 7/2023 | Sharma et al. |

FOREIGN PATENT DOCUMENTS

| | | |
|---|---|---|
| CN | 107087255 A | 8/2017 |
| CN | 107113195 A | 8/2017 |
| CN | 107743100 A | 2/2018 |
| CN | 108270823 A | 7/2018 |
| CN | 108293004 A | 7/2018 |
| CN | 108566659 A | 9/2018 |
| CN | 109120426 A | 1/2019 |
| CN | 109391498 A | 2/2019 |
| CN | 109417731 A | 3/2019 |
| EP | 3396997 A1 | 10/2018 |
| WO | 2017/197273 A1 | 11/2017 |
| WO | 2018/000239 A1 | 1/2018 |
| WO | 2018/035431 A1 | 2/2018 |
| WO | 2018/067780 A1 | 4/2018 |
| WO | 2018/089634 A1 | 5/2018 |
| WO | WO2018137499 A1 | 8/2018 |
| WO | 2018/169382 A1 | 9/2018 |
| WO | 2018/196793 A1 | 11/2018 |
| WO | 2018/228674 A1 | 12/2018 |
| WO | 2019/064274 A1 | 4/2019 |
| WO | 2019/160390 A1 | 8/2019 |
| WO | 2019/184967 A1 | 10/2019 |
| WO | 2019/206396 A1 | 10/2019 |
| WO | 2020/074687 A1 | 4/2020 |
| WO | 2020/193394 A1 | 10/2020 |
| WO | 2021/110894 A1 | 6/2021 |
| WO | 2021/122516 A1 | 6/2021 |

OTHER PUBLICATIONS

Extended European Search Report for EP 19219178.1, entitled "Managing Resource Utilization by Multiple Network Slices," dated Jun. 24, 2020.
3GPP TS 28.533 V16.1.0 (Sep. 2019), Technical Specification, 3rd Generation Partnership Project; Technical Specification Group Services and System Aspects; Management and orchestration; Architecture framework (Release 16).
3GPP TS 28.531 V16.3.0 (Sep. 2019), Technical Specification, 3rd Generation Partnership Project; Technical Specification Group Services and System Aspects; Management and orchestration; Provisioning (Release 16).
ETSI GS NFV-MAN 001 V1 .1.1 (Dec. 2014), Network Functions Virtualisation (NFV); Management and Orchestration.
3GPP TR 28.801; Technical Specification Group Services and System Aspects; Telecommunication management; Study on management and orchestration of network slicing for next generation network (Release 15), pp. 1-75: VIS.1.0(SSA WGS) (Jan. 4, 2018).
3GPP TS 22.261 v16.3.0, 3rd Generation Partnership Project; Technical Specification Group Services and System Aspects; Service requirements for the 5G system; Stage 1 (Release 16) (Mar. 2018).
3GPP TS 23.502 V16.2.0 (Sep. 2019), Technical Specification, 3rd Generation Partnership Project; Technical Specification Group Services and System Aspects; Procedures for the 5G System (SGS); Stage 2 (Release 16).
3GPP TS 28.530, "Management and orchestration; Concepts, use cases and requirements," 3GPP, Sep. 2018.
3rd Generation Partnership Project (3GPP) TS 23.501 V16.2.0 (Sep. 2019), Technical Specification, 3rd Generation Partnership Project; Technical Specification Group Services and System Aspects; System Architecture for the SG System (SGS); Stage 2 (Release 16).
China Telecom et al: "Discussion on network slice priority", 3GPP Draft; S5-185607 Discussion on Network Slice Priority, 3rd Generation Partnership Project (3GPP), Mobile Competence Centre ; 650, Route Des Lucioles ; F-06921 Sophia-Antipolis Cedex ; France • vol. SA WG5, No. Belgrade (Serbia); Aug. 20, 2018-Aug. 24, 2018 Aug. 24, 2018 (Aug. 24, 2018), XP051544208.
Huawei, "Add use case and requirement for network slice instance priority", 3GPP Draft; SS-175111 PCR 28 530 Add Use Case and Requirement for Network Slice Instance Priority, 3rd Generation Partnership Project (3GPP), Oct. 16, 2017-Oct. 20, 2017: F-069(SA WGS) (Oct. 15, 2017).

(56) References Cited

OTHER PUBLICATIONS

Qiang, L., et al., "Technology Independent Information Model for Network Slicing; draft-qiang-coms-netslicing-information-model-01," Internet Engineering Task Force, pp. 1-25, Standard working draft, Internet Society, Rue Des Falaises Ch-120, No. 1 (2017).

Qualcomm Incorporated: "(TP for NR BL CR for TS 38.413): General Fallback", 3GPP Draft; R3-184685 General Fallback, Aug. 11, 2018.

Kotulski, Z., et al., Towards constructive approach to end-to-end slice isolation in 5G networks, EURASIP Journal on Information Security, (2018) 2018:2, 23 pages.

Ren, C., et al., Network Slicing: Building Customizable 5G Network, ZTE Technology Journal, Feb. 2018, vol. 24(1) 5 pages. DOI: 10.3969/j.issn.1009-6868.2018.01.006.

Silver D.S., et al., An Invariant for Open Virtual Strings, Journal of Knot Theory and Its Ramifications, Oct. 2004, 10 pages.

Wang, R., et al., Survey of 5G network slicing, Journal of Nanjing University of Posts and Telecommunications (Natural Science Edition, vol. 38(5), Oct. 2018, 9 pages.

3GPP TR 29.890 V1.2.0 Technical Specification Group Core Network and Terminals; Study on CT WG3 Aspects of 5G System—Phase 1; Stage 3 (Release 15) (Dec. 2017).

Wang, Q., et al., "Architecture and Key technologies of 5G Transport Network Slicing," ZTE Technology Journal, 24(1):58-61 (Feb. 2018).

\* cited by examiner

MANAGING RESOURCE UTILIZATION BY MULTIPLE NETWORK SLICES

This application is the U.S. National Stage of International Application No. PCT/EP2020/087392, filed Dec. 21, 2020, which designates the U.S., published in English, and claims priority under 35 U.S.C. § 119 or 365(c) to European Application No. 19219178.1, filed Dec. 21, 2019. The entire teachings of the above applications are incorporated herein by reference.

FIELD OF THE INVENTION

The invention relates to a network function which has a resource which is utilizable by multiple network slices and shared amongst the multiple network slices. The invention further relates to a system for managing a resource utilization of the resource, and to a computer-implemented method for managing the resource utilization of the resource. The invention further relates to a computer program comprising instructions for performing the computer-implemented method.

BACKGROUND ART

Next generation network architectures, such as 5G, may separate network functions from the underlying hardware resources, being in the case of a telecommunication network the network nodes of the network. For that purpose, so-called Network Virtualization (NV) techniques may be used, and in particular Network Function Virtualization (NFV) techniques which provide network functions that are instantiable in software using the hardware of one or more of the network nodes.

Such next generation network architectures may further define virtual data planes which separate data traffic in the network. Such virtual data planes, which may be established by Software-Defined Network (SDN) but also by other techniques, may include a control plane to enable transmission of control data in the network, and a user plane to enable transmission of user data to and/or from User Equipment (UE) connected to the network. The user plane may also be referred to as 'data plane'.

A design target of such and similar next generation network architectures is to provide networks which may be 'tailored' to the requirements of the applications which use the network. Such tailoring may be obtained by instantiation of different network slices which represent virtual networks with different feature sets, e.g., providing different network functions and/or having different network characteristics.

A specific example is 5G network slicing, which allows for the creation of virtual network slices on top of the physical network fabric, with the network slices being tailorable towards requirements of specific applications and application categories. For example, the tailoring may be in terms of Quality of Service (QoS) (e.g., bandwidth, delay, jitter, etc.), network topology (e.g., Local Break Out) and/or in specific functions (e.g., local processing: caching, transcoding, synchronization, etc.). For example, in the case of video streaming, such specific functions in a network slice may include a local streaming server (to minimize latency and possibly increase bandwidth), a transcoder (to re-encode a video stream in a format suitable for the UE), an MPEG DANE (for QoS management), an ICE/STUN server (for NAT traversal), a stream synchronizer (e.g., a device that supports the UE in the synchronization of multiple audio-visual streams, e.g., for a videoconferencing application), and more. This tailoring of feature sets is expected to enable new services, e.g., where ultra-low latency is required, such as Virtual Reality (VR) and Augmented Reality (AR), and improve the performance of existing services, e.g., video streaming in a highly mobile environment.

Network slices may be managed by a network operator using network functions which are accessible to the network operator. For example, in 5G, the Network Slice Management Function (NSMF) and the Network Slice Subnet Management Function (NSSMF) [1] may be used in the management of network slices.

Network slices may ultimately rely on resources of the physical infrastructure of a communication network, for example to transport traffic of network slices, to switch traffic of network slices, to provide computing resources to applications of network slices, to provide storage resources to applications of network slices, etc. This physical infrastructure may comprise physical network equipment, such as ethernet cables, optical-fiber cables, physical servers, routers and switches. In general, the physical infrastructure may comprise physical network functions (PNF), which refers to parts of the infrastructure providing specific networking functions, such as the aforementioned routing or switching of traffic or a computing and/or storage function.

Multiple network slices may share the bandwidth, switching capacity, computing capacity and/or storage capacity of a particular physical network function, or may in general share a resource provided by the physical network function. It is known to statically define a maximum bandwidth to be used for a network slice [2].

However, there is currently no mechanism to provide guarantees on minimum resource availability of a shared resource of a network function per network slice, nor any mechanism to safeguard such guarantees. This may make it difficult to provide end-to-end service guarantees, e.g., to ensure that QoS guarantees on the network slice level are safeguarded on the physical infrastructure level.

The above not only applies to physical network functions but may also apply to virtual network functions, which may also be referred to as 'virtualized' network functions. Such virtual network functions may be instantiated on top of the physical infrastructure and may, in a similar way as physical network functions, provide a resource which may be sharedly utilized by multiple network slices.

REFERENCES

[1] 3GPP TS 28.533 V16.1.0 (2019 September), Technical Specification, 3rd Generation Partnership Project; Technical Specification Group Services and System Aspects; Management and orchestration; Architecture framework (Release 16)

[2] 3GPP TS 28.531 V16.3.0 (2019 September), Technical Specification, 3rd Generation Partnership Project; Technical Specification Group Services and System Aspects; Management and orchestration; Provisioning (Release 16)

SUMMARY OF THE INVENTION it may be desirable to be able to provide guarantees for the minimum resource availability of a shared resource of a network function on a network slice level, e.g., to individual network slices, and to ensure that such guarantees are safeguarded.

In accordance with a first aspect of the invention, a system may be provided which may be configured as slice resource distribution function of a network. The network may support instantiation of network slices which each may comprise one or more virtual networks. The system may comprise:

a communication interface to a network function having a resource which may be utilizable by multiple network slices and which may be shared amongst the multiple network slices;

a processor subsystem which may be configured to:
receive configuration data which may be indicative of, for each of the multiple network slices, a minimum guaranteed resource availability which is guaranteed to a respective network slice for utilization of the resource;

and to manage a resource utilization of the resource by:
aggregating a resource utilization by each of the multiple network slices to determine an overall resource utilization of the resource;

if the overall resource utilization is within a range of a maximum resource utilization level of the resource, reduce the resource utilization of at least one of the multiple network slices of which the resource utilization exceeds the minimum guaranteed resource availability guaranteed to the respective network slice.

In accordance with a further aspect of the invention, a computer-implemented method may be provided for providing slice resource distribution functionality in a network. The network may support instantiation of network slices which each comprise one or more virtual networks. The network may comprise a network function having a resource which may be utilizable by multiple network slices and which may be shared amongst the multiple network slices. The method may comprise:

receiving configuration data which may be indicative of, for each of the multiple network slices, a minimum guaranteed resource availability which may be guaranteed to a respective network slice for utilization of the resource;

and managing a resource utilization of the resource by:
aggregating a resource utilization by each of the multiple network slices to determine an overall resource utilization of the resource;

if the overall resource utilization is within a range of a maximum resource utilization level of the resource, reducing the resource utilization of at least one of the multiple network slices of which the resource utilization exceeds the minimum guaranteed resource availability guaranteed to the respective network slice.

In accordance with a further aspect of the invention, a computer-readable medium may be provided comprising transitory or non-transitory data representing a computer program. The computer program may comprise instructions for causing a processor system to perform the computer-implemented method.

The above measures may involve providing a slice resource distribution function which may manage the resource utilization of a network function. The network function itself may have a resource which may be utilizable by multiple network slices and which may be shared amongst the multiple network slices. For example, the network function may provide a bandwidth for the transportation of traffic, which bandwidth may be shared amongst the traffic of multiple network slices. Here, the term 'shared' may refer to network slices being able to utilize the resource concurrently. For example, in case of bandwidth, each network slice may use a part of the available bandwidth, and in case of switching, computing and/or storage capacity, each network slice may use a part of the available switching, computing and/or storage capacity.

To enable the management of the resource utilization of the multiple network slices, configuration data may be obtained which may be indicative of a minimum resource availability which has been guaranteed to a respective network slice for utilization of the resource. Such a guaranteed minimum availability of the resource may elsewhere also be referred to as a 'minimum guaranteed resource availability'. Such guarantees may for example be provided by a slice management system which may be configured to manage network slices in the network. In a specific example, a network slice may be guaranteed a minimum available bandwidth of 8 Gb/s. The configuration data may directly define this guaranteed bandwidth, or in some embodiments contain data which enables the slice resource distribution function to determine the minimum guaranteed resource availability from the configuration data, for example by defining the minimum guaranteed resource availability as a relative measure (e.g. as a percentage) of the maximum resource availability of the resource.

Having determined a minimum guaranteed resource availability for each of the multiple network slices, the slice resource distribution function may then manage the resource utilization of the resource by aggregating the actual resource utilization of each of the multiple network slices. Here, the term 'actual' may refer to a current resource utilization, with the term 'current' referring to substantially the present time while allowing for typical computing and networking delays. Such aggregation may for example comprise simply summing the individual resource utilizations. For example, if a first network slice currently uses 4 Gb/s and a second network slice uses 2 Gb/s, the aggregated resource utilization may be 6 Gb/s. The aggregated resource utilization may elsewhere also be referred to as the 'overall' resource utilization of the resource. It is noted that the overall resource utilization may also be expressed relative to a maximum resource utilization level of the resource. For example, if the maximum bandwidth is 8 Gb/s, the overall resource utilization may be expressed as 75%.

Having determined the overall resource utilization, the slice resource distribution function may determine, for example on a continuous or periodic or semi-periodic basis, if the maximum resource utilization level of the resource is or is to be reached. For that purpose, the slice resource distribution function may determine whether the overall resource utilization is within a range of the maximum resource utilization level. Here, the term 'within a range' may for example refer to a percentage-wise range, e.g., in a range of 95% to 100% of the maximum resource utilization level, or an absolute range, e.g., in a range of 7.8 Gb/s to 8.0 Gb/s, and may in general express that the overall resource utilization is at or near its maximum.

If the overall resource utilization is determined to be at or near its maximum, the slice resource distribution function may reduce the resource utilization of at least one of the multiple network slices. In particular, the resource utilization of a network slice may be reduced of which the resource utilization exceeds its minimum guaranteed resource availability. For that purpose, known reduction techniques may be used, such as traffic shaping in the case of bandwidth, throttling in the case of switching capacity or computing capacity or dynamic storage reallocation in the case of storage capacity. The latter may also be referred to as 'storage scaling' in some contexts.

The above measures may have the effect that the resource utilization of a resource of a network function may be managed to safeguard minimum availability guarantees for network slices. Such guarantees may be issued elsewhere in the network, e.g., by other network functions operating in the slice domain, such as a slice management function, but may be applied by the slice resource distribution function to the utilization by the network slices of a resource of a particular network function.

While such guarantees may prescribe minimums for the resource availability, the slice resource distribution function may allow a network slice to exceed its guaranteed minimum, for example in case the overall resource utilization of the resource is well below the maximum resource utilization level of the resource. However, if the maximum resource utilization level is or is nearly reached, e.g., is within a range of its maximum, the resource utilization may be managed by the slice research distribution function. In particular, the slice resource distribution function may reduce the resource utilization of at least one network slice which is above its guaranteed minimum. Thereby, resource capacity may be freed for (an)other network slice(s).

This way, if a second network slice currently utilizes the resource at a utilization level below its minimum guaranteed availability level, it may be ensured that the second network slice is able to still increase its utilization. Namely, if the resource capacity which is freed by reducing the utilization of the resource by a first network slice is then utilized by the second network slice, the overall resource utilization may again approach the maximum resource utilization level, which may again trigger the slice resource distribution function to reduce the resource utilization of the first (or another) network slice, thereby again freeing further capacity for the second network slice.

By performing the above steps on a continuous or periodic or semi-periodic basis, the resource utilization may be redistributed between network slices, in that capacity may be freed for network slices which are below their minimum guaranteed levels while the resource utilization of network slices which are above their minimum guarantees may be reduced. The above may be performed if the overall resource utilization is at or near its maximum, while otherwise, network slices may be allowed to utilize the resource above their minimum guaranteed levels. This process may repeat itself until the overall resource utilization is not at or near the maximum resource utilization level anymore, or until the resource utilization of each network slice is at or below its respective minimum guaranteed resource availability. In the latter case, the resource utilization may have been redistributed such that no network slice uses excess resource capacity above its minimum guaranteed resource availability.

The above measures may provide several advantages. For example, guarantees for minimum resource availabilities for network slices may be safeguarded while at the same time also allowing the resource of the network function to be optimally or at least adequately utilized, e.g., at or near its fullest capacity. Namely, 'spare' guaranteed resource availability, referring to the resource capacity which is guaranteed but currently not used by a network slice, may be used by other network slices instead of being simply being reserved but not utilized. Only if the overall resource utilization is at or near its maximum, thereby preventing a network slice from making use of its guaranteed minimum resource availability, resource capacity may be created by reducing the resource utilization of (an)other network slice (s) which is/are above its/their guaranteed minimum. Compared to the static allocation of resource capacity for a respective network slice in accordance with its minimum guaranteed resource availability, the resource of a network function may be more efficiently used.

The slice resource distribution function may generally bridge a gap between the slice domain, in which such minimum guaranteed resource availabilities may be given for network slices, and the network function domain, which may in many cases not be aware of network slices but may simply handle the traffic of multiple network slices and/or application requests (e.g., for computing or storage) of applications in the multiple network slices. Thereby, the slice resource distribution function may enable or facilitate providing end-to-end service guarantees, e.g., to ensure that QoS guarantees on the network slice level are safeguarded on the network function level, for example on the physical infrastructure level in case of a physical network function.

In an embodiment, the network may comprise a slice management system for management of the multiple network slices, and the processor subsystem may be configured to receive the configuration data from the slice management system. The multiple network slices may be managed by a slice management system of the network, which may comprise one or more slice management functions, such as the NSMF and NSSMF introduced the background section of the specification. The slice management system may guarantee a minimum resource availability for a network slice. This minimum resource availability may then be safeguarded with respect to a specific network function by the slice management system providing configuration data indicative of the minimum guaranteed resource availability to the slice resource distribution function. Effectively, the slice resource distribution function may function as an interface between the slice management system and the network function. While the slice management system may be unable or undesired to directly interface with the network function, and while the network function may not have knowledge of network slices, the slice resource distribution function may translate between both domains by receiving the configuration data from the slice management system and by managing the resource utilization of the resource of the network function, for example by providing appropriate instructions to the network function. It may therefore not be needed for the slice management system and the network function to be able to directly communicate with each other, nor specifically to be able to communicate with respect to resource utilization by network slices and/or virtual networks. This may adhere to so-called 'separation of concerns' design principles for network functions.

In an embodiment, the processor subsystem may be configured to send a resource reduction confirmation message to the slice management system, wherein the resource reduction confirmation message may be indicative of the resource utilization by the at least one of the multiple network slices having been reduced. This may enable the slice management system to act upon the fact that the overall resource utilization is or previously was within a range of the maximum resource utilization level of the resource. For example, if resource utilization issues persist, the slice management system may decide to allocate more resources to the network function.

In an embodiment, the network function may comprise a measurement function for determining the resource utilization of the resource of the network function, and the processor subsystem may be configured to receive resource utilization data from the measurement function, wherein the resource utilization data may be indicative of the resource utilization by each of the multiple network slices. The resource utilization may thus be determined by the network function itself, or more specifically, by a subfunction of the network function. This function, which may be termed 'measurement function' or 'monitoring function', may obtain or generate resource utilization data and transmit the resource utilization data to the slice resource distribution function, for example on a continuous or periodic or semi-periodic basis. In a specific example, the network function may provide such resource utilization data in response to a request of the slice resource distribution function, or the slice resource distribution function may subscribe for such data with the network function. Such determining of the resource utilization may comprise the network function directly measuring the resource utilization, but may also include indirect ways of measurement, e.g., by obtaining resource utilization data from one or more 'low-level' measurement subfunctions. Determining the resource utilization from within the network function may be more efficient than having to determine the resource utilization from outside of the network function, as the latter may involve having to indirectly estimate rather than more directly measure the resource utilization.

In an embodiment, the configuration data may comprise virtual network identifiers of the respective virtual networks of the multiple network slices, and the resource utilization data may be indicative of the resource utilization per virtual network by linking a determined resource utilization to a respective virtual network identifier. The network function may not have knowledge on network slices, but may be able to attribute the resource utilization to a virtual network. The slice resource distribution function on the other hand may be able to attribute a virtual network to a network slice, for example by being provided with such a mapping from a third-party. A specific example of such a third-party is the so-called 'interfacing system' as described in the co-pending European patent application 19213388. The slice resource distribution function may communicate with the interfacing system to attribute the virtual network identifiers listed in the resource utilization data to network slices managed by the slice management system and thereby to map the resource utilization of virtual networks of network slices to the minimum resource availability guaranteed to network slices. Accordingly, the slice resource distribution function may be enabled to map a virtual network to a network slice using information obtained from the interfacing system, and may on that basis attribute the resource utilization reported in the resource utilization data for a particular virtual network to a particular network slice. This may enable the slice resource distribution function to manage the resource utilization of network slices on the basis of the resource utilization reported for virtual networks.

In an embodiment, the processor subsystem may be configured to send a measurement instruction message to the measurement function to instruct the measurement function to determine the resource utilization by the multiple network slices, wherein the measurement instruction message may comprise the virtual network identifiers of the respective virtual networks of the multiple network slices. The slice resource distribution function may instruct the measurement function to determine the resource utilization by the multiple network slices, e.g., by performing measurements. In accordance with this embodiment, it may do so by providing the measurement function with the virtual network identifiers of the virtual networks which are comprised in the multiple network slices. Even though the measurement function may not have knowledge on network slices per se, it may nevertheless determine the resource utilization by these network slices on the basis of the virtual network identifiers.

In an embodiment, the network function may be a virtual network function (VNF) which may be instantiated by a network function virtualization system (NFV-MANO) of the network. An example of a network function virtualization system is the aforementioned NFV-MANO [3], but may also include other types of network virtualization systems, such as a 'Openstack Heat' (https://wiki.openstack.org/wiki/Heat)-based system or a network virtualization system based on the Open Network Automation Platform (ONAP, https://www.onap.org/) or in general any other appropriately configured network virtualization system. In accordance with this embodiment, the slice resource distribution function may be configured to manage resource utilization of a resource of a virtual network function. As indicated previously for physical network functions, a virtual network function may have a same type of resource, e.g., a bandwidth, a switching capacity, a computing capacity, a storage capacity, etc., which may be managed in a same manner.

In an embodiment, the network function may be a physical network function (PNF), such as a switch or a router or a physical server providing computing capacity and/or storage capacity.

In an embodiment, the network function may comprise a resource reduction function for reducing the resource utilization of the resource, and the processor subsystem may be configured to send a resource reduction instruction message to the resource reduction function to instruct the resource reduction function to reduce the resource utilization by the at least one of the multiple network slices of which the resource utilization exceeds the minimum guaranteed resource utilization availability. The slice resource distribution function may generally instruct a resource reduction function, which may be separate of the slice resource distribution function, to reduce the resource utilization by one or more network slices. In accordance with this embodiment, the network function itself may comprise the resource reduction function, e.g., by being configured to perform traffic shaping, throttle the switching rate or computing processes or by reallocating storage capacity. The slice resource reduction function may therefore provide instructions to the resource reduction function to reduce the resource utilization by one or more specific network slices, for example by providing the network function with the virtual network identifiers of the virtual networks which are comprised in the multiple network slices. Even though the network function may not have knowledge on network slices per se, it may nevertheless reduce the resource utilization by these network slices on the basis of the virtual network identifiers.

In an embodiment, the processor subsystem may be configured to manage the resource utilization for multiple network functions by:

determining a respective overall resource utilization of a respective resource of each one of the multiple network functions; and reducing or redistributing the overall resource utilization of at least one of the network functions if the overall resource utilization of the resource of said network function is within a range of a maximum resource utilization level of said resource.

In accordance with this embodiment, the slice resource distribution function may manage the resource utilization of the resources of multiple network functions. For that purpose, the slice resource distribution function may be implemented as a separate network function, e.g., separate from the network function(s) being managed. The functionality of managing the resource utilization of the resource of each individual network function may be the same functionality as described elsewhere.

In an embodiment, the processor subsystem may be configured to cross-correlate the resource utilization by network slices between the multiple network functions to identify of which network slice the resource utilization is to be reduced on the basis of the network slice being already limited in its resource utilization of a dependent resource of another network function. In accordance with this embodiment, the slice resource distribution function may additionally be configured to cross-correlate the resource utilization between the multiple network functions. Here, the term 'cross-correlate' may comprise linking the resource utilization by a network slice across the multiple network functions. By doing so, the slice resource distribution function may identify dependent resources, which may refer to a resource of a network function which may be utilized by a particular network slice and of which the utilization may be dependent on the utilization of another resource of another network function by the same network slice. An example of a dependent resource may be the following. A network slice may utilize bandwidth on a first network function and on a second network function. In case the second network function is located downstream of the first network function, the bandwidth utilization at the second network function may be dependent on the bandwidth utilization at the first network function, in that it may be determined that the former will never exceed the latter since the latter may represent a bottleneck for the former. By being able to cross-correlate such dependent resource utilization, the slice resource distribution system may not only redistribute resources between different network slices with respect to a first network function, but also between different network functions. In the aforementioned example, it may not be needed to reduce the resource utilization of other network slices on the second network function even if the maximum bandwidth is reached at the second network function since the first-mentioned network slice may be unable to reach its minimum guaranteed bandwidth in view of the bandwidth limitations at the first network function.

In an embodiment, the resource utilization of the resource which is managed by the system may be at least one of:
  a utilization of a bandwidth of the network function which is available for the transporting traffic of the multiple network slices;
  a utilization of a switching capacity of the network function which is available for switching traffic of the multiple network slices;
  a utilization of a computing capacity of the network function which is available for use by applications of the multiple network slices;
  a utilization of a storage capacity of the network function which is available for use by applications of the multiple network slices.

In some embodiments, the slice resource distribution function may manage several types of resources concurrently, e.g., bandwidth and computing capacity.

In an embodiment, a system may be provided which may represent a network function having a resource which is utilizable by multiple network slices and shared amongst the multiple network slices. The network function may comprise the system configured as slice resource distribution function as a subsystem. Effectively, the slice resource distribution function may be a part of the network function and may internally communicate with a measurement function and/or a resource reduction function, wherein the latter may also be subfunctions of the network function.

In an embodiment, the communication network may comprise a core network, e.g., of a connectivity provider's network. In an embodiment, the connectivity provider's network may be a network adhering to one or more 3GPP standards.

It will be appreciated by those skilled in the art that two or more of the above-mentioned embodiments, implementations, and/or aspects of the invention may be combined in any way deemed useful.

Modifications and variations of any one of the systems, methods and/or computer programs, which correspond to the described modifications and variations of another one of these systems, methods and/or computer programs, and vice versa, may be carried out by a person skilled in the art on the basis of the present description.

FURTHER REFERENCES

[3] ETSI GS NFV-MAN 001 V1.1.1 (2014 December), *Network Functions Virtualisation (NFV); Management and Orchestration*

BRIEF DESCRIPTION OF THE DRAWINGS

These and other aspects of the invention are apparent from and will be elucidated with reference to the embodiments described hereinafter. In the drawings.

Figure 1:
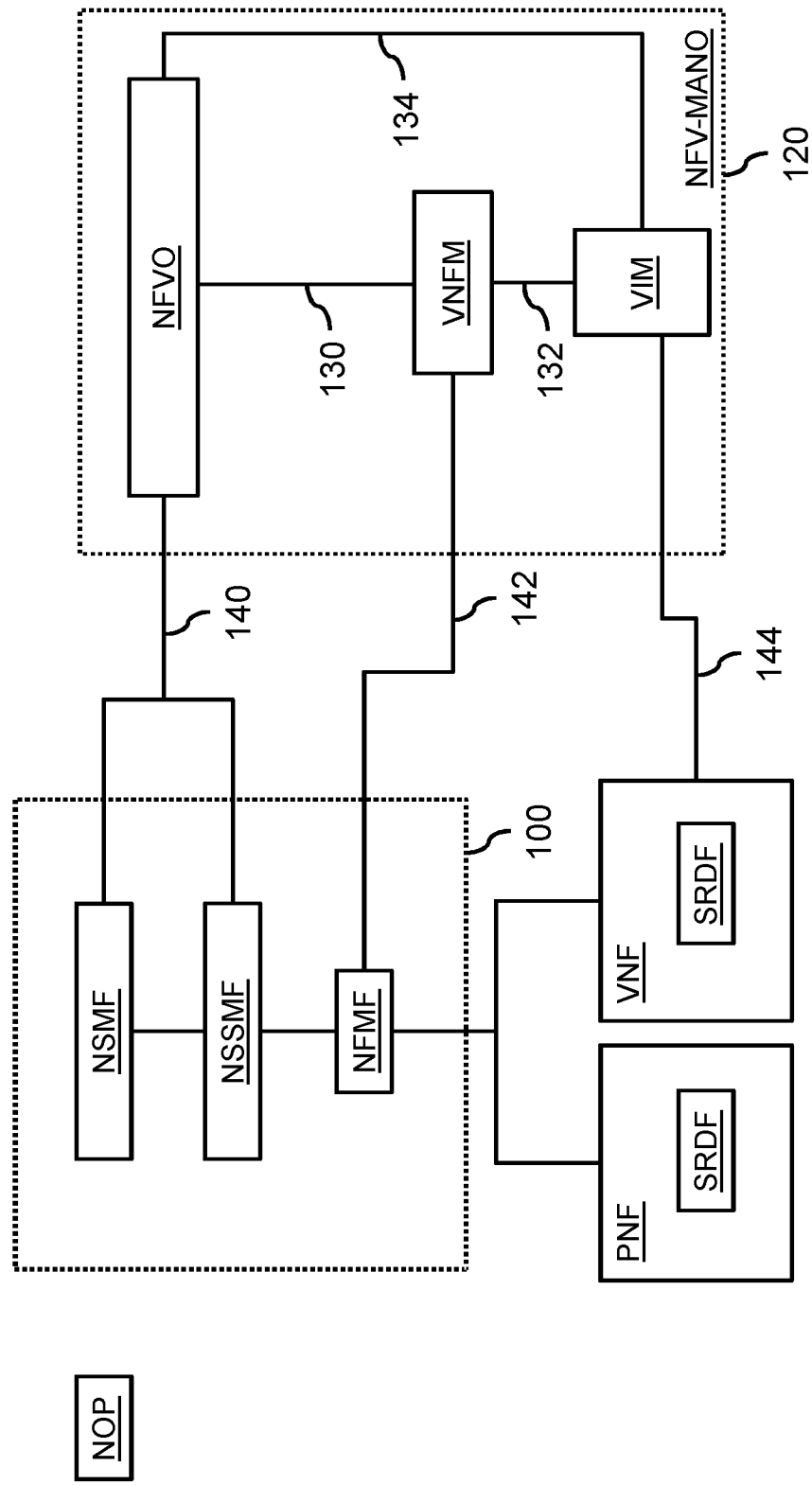
FIG. 1 shows a part of a communication network comprising a slice management system and a network function virtualization system, wherein the communication network further comprises a physical network function and a virtualized network function which each comprise a slice resource distribution function.

It should be noted that items which have the same reference numbers in different figures, have the same structural features and the same functions, or are the same signals. Where the function and/or structure of such an item has been explained, there is no necessity for repeated explanation thereof in the detailed description.

LIST OF REFERENCE AND ABBREVIATIONS

The following list of references and abbreviations is provided for facilitating the interpretation of the drawings and shall not be construed as limiting the claims.

3GPP 3rd generation partnership project
MF measurement function
NFMF network function management function
NFV network functions virtualization
NFV-MANO NFV management and network orchestration
NFVO NFV orchestrator
NOP network operator
NSD network slice description
NSI network slice instance
NSMF network slice management function
NSSMF network slice subnet management function
PNF physical network function
QOS quality of service
RAN radio access network
ShF shaping function
SRDF slice resource distribution function
UE user equipment
UPF user plane function
VIM virtualized infrastructure manager
VNF virtual(ized) network function
VNFM virtual(ized) network function manager
1-6 messages/steps in information flow
11-15 messages/steps in information flow
2', 3', 5', 7' messages/steps in information flow
11', 13', 15' messages/steps in information flow
100 slice management system
120 network function virtualization system
130 Or-Vnfm interface
132 Vi-Vnfm interface
134 Or-Vi interface
140 Os-Ma-nfvo interface
142 Ve-Vnfm-em interface
144 Ve-Vnfm-vnf interface
200 system
210 communication interface
220 processor subsystem
230 data storage
300 computer-readable medium
310 non-transitory data
1000 exemplary data processing system
1002 processor
1004 memory element
1006 system bus
1008 local memory
1010 bulk storage device
1012 input device
1014 output device
1016 network adapter
1018 application

DETAILED DESCRIPTION OF EMBODIMENTS

The following embodiments are described in the context of a communication network adhering to one or more 5G 3GPP and related standards, for example as defined by [1]-[3]. However, the concepts described in the following embodiments may equally apply, mutatis mutandis, to any other type of communication network which supports instantiation of network slices which each comprise one or more virtual networks and has a network function as defined by the wording of the appended claims, e.g., having a resource which is sharedly utilizable by multiple network slices.

FIG. 1 shows a part of a communication network which may support instantiation of network slices which each comprise one or more virtual networks. For that purpose, the communication network may comprise a slice management system 100 and a network function virtualization system 120. The slice management system 100 is by way of example shown to be a 3GPP slice management system which may comprise functions such as a network slice management function (NSMF), a network slice subnet management function (NSSMF) and a network function management function (NFMF). The network function virtualization system 120 is by way of example shown to be a network functions virtualization (NFV) management and network orchestration (NFV-MANO) which may comprise entities such as an NFV orchestrator (NFVO), a virtualized network function manager (VNFM) and a virtualized infrastructure manager (VIM). The NFV-MANO is in this example shown to comprise internal interfaces 130-134 and external interfaces 140-144 which may be known per se. In general, the communication network may be a mobile network which may comprise radio access network (RAN) nodes (not shown in FIG. 1) and core network nodes. However, this is not a limitation, in that the communication network may also be a fixed-line network, a combination of a mobile and a fixed-line network, etc.

By way of example, the communication network is further shown to comprise a physical network function (PNF) and a virtualized network function (VNF). Examples of physical network functions include, but are not limited to, switches or routers or physical servers providing computing capacity and/or storage capacity. Examples of virtualized network functions include, but are not limited to, virtualized versions of switches or routers or virtual servers providing computing capacity and/or storage capacity. It will be appreciated that some types of communication networks may only comprise physical network functions while other types of communication networks may comprise both physical network functions and virtual network functions. It is noted that the former type of communication network may not need to comprise a network function virtualization system 120, while the latter type of communication network may comprise the network function virtualization system 120 to instantiate and manage the virtualized network functions, including the depicted instance of a VNF.

FIG. 1 further shows each of the network functions PNF, VNF to comprise a slice resource distribution function (SRDF) which may manage a resource utilization of a resource of the respective network function PNF, VNF. The resource may be a resource which is utilizable by multiple network slices and shared amongst the multiple network slices. For example, the resource may be a bandwidth, switching capacity, computing capacity and/or storage capacity of the respective network function PNF, VNF. The network slices may be instantiated and managed by the slice management system 100. It will be appreciated that network functions may have different types of resources and/or resources which differ in terms of maximum resource utilization level. For example, the physical network function PNF may provide traffic switching functionality while the virtual network function VNF may provide storage capacity.

As will also be elucidated in more detail with reference to FIGS. 2-6, the slice resource distribution function SRDF may be configured to receive configuration data which may be indicative of, for each of the multiple network slices, a minimum guaranteed resource availability which is guaranteed to a respective network slice for utilization of the resource. The slice resource distribution function SRDF may be further configured to manage a resource utilization of the resource by aggregating a resource utilization by each of the multiple network slices to determine an overall resource utilization of the resource, and if the overall resource utilization is within a range of a maximum resource utilization level of the resource, reducing the resource utilization of at least one of the multiple network slices of which the resource utilization exceeds the minimum guaranteed resource availability guaranteed to the respective network slice.

Various embodiments of the above-mentioned functionality are described with reference to FIGS. 2-6, with these Figs. also showing respective information flows between entities. Such information flows may comprise the exchange of data between the entities, but may in some cases may represent internal operations of a respective entity. An example of the exchange of data is the exchange of messages.

Figure 2:
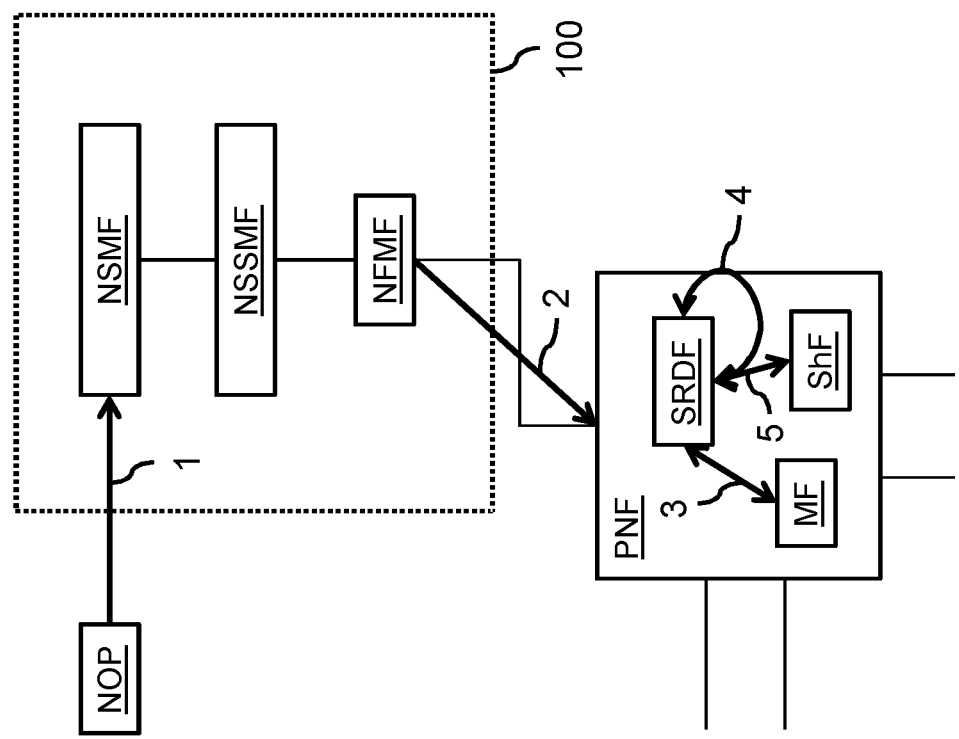
FIG. 2 shows an information flow between the network operator, the slice management system and the physical network function.

FIG. 2 shows an information flow between a network operator (NOP), the slice management system 100 and the physical network function PNF. The network operator NOP is by way of illustration shown to be one entity in FIGS. 1-6 but may technically be represented by one or more technical systems which may be operated by the network operator and which may be connected to the communication network.

The information flow of FIG. 2 may comprise the following steps, which may be identified by numbers which may match the reference numerals in FIG. 2.

1. The network operator NOP may configure one or more network slices and may specify or request a minimum guaranteed resource availability for the network slice(s) in slice management system 100, e.g., by sending appropriate data. As such, the minimum guaranteed resource availability may be a configuration parameter of a respective network slice, which may be configurable by the network operator NOP.

2. The slice management system 100 may inform the physical network function PNF about the configuration, e.g., by sending corresponding configuration data. The physical network function PNF may comprise a slice resource distribution function SRDF which may receive this configuration data, either directly or indirectly.

3. The slice resource distribution function SRDF may obtain resource utilization data (such as bandwidth, switching capacity, computing capacity, storage capacity) from a measurement function (MF) within the physical network function PNF. This may for example be performed on a continuous or periodic or semi-periodic basis. For that purpose, the slice resource distribution function SRDF may send an (internal) measurement instruction message to the measurement function MF. The resource utilization data may indicate a current resource utilization of the resource of the physical network function PNF for the one or more network slices and per respective network slice, or as also elucidated elsewhere, per virtual network of a respective network slice. It is noted that the resource utilization data may also be referred to as 'measurement data' or 'monitoring data'.

4. The slice resource distribution function SRDF may analyze the resource utilization data of the network slices, for example on a continuous or periodic or semi-periodic basis, and may in particular determine an aggregate of the resource utilization of the resource across the different network slices which make use of the resource.

5. If the overall resource usage exceeds a limit of the physical network function PNF, which may be a physical or virtual limit and which may elsewhere also be referred to as a 'maximum resource utilization level', the slice resource distribution function SRDF may instruct a shaping function (ShF) to shape down the resource usage of at least one network slice which exceeded its minimum guaranteed resource availability, for example by sending an (internal) resource reduction instruction message. The slice resource distribution function SRDF may learn of the maximum resource utilization level from within the physical network function PNF, for example by obtaining a configuration parameter or other types of information which may be indicative of the maximum bandwidth, the maximum switching capacity, the maximum processing capacity and/or the maximum storage capacity of the resource.

It is noted that the actions taken by the shaping function may be referred to as 'shaping actions', and that the shaping function may differ depending on the type of resource and may elsewhere also be referred to as a 'resource reduction function'.

The above steps 3 to 5 may be repeated, e.g., on a continuous or periodic or semi-periodic basis, until the overall resource utilization is not at or near the maximum resource utilization level anymore, or until the resource utilization of each network slice is at or below its respective minimum guaranteed resource availability. Steps 1 and 2 may be repeated where needed, for example if the network operator NOP reconfigures a minimum guaranteed resource availability for a network slice.

Figure 3:
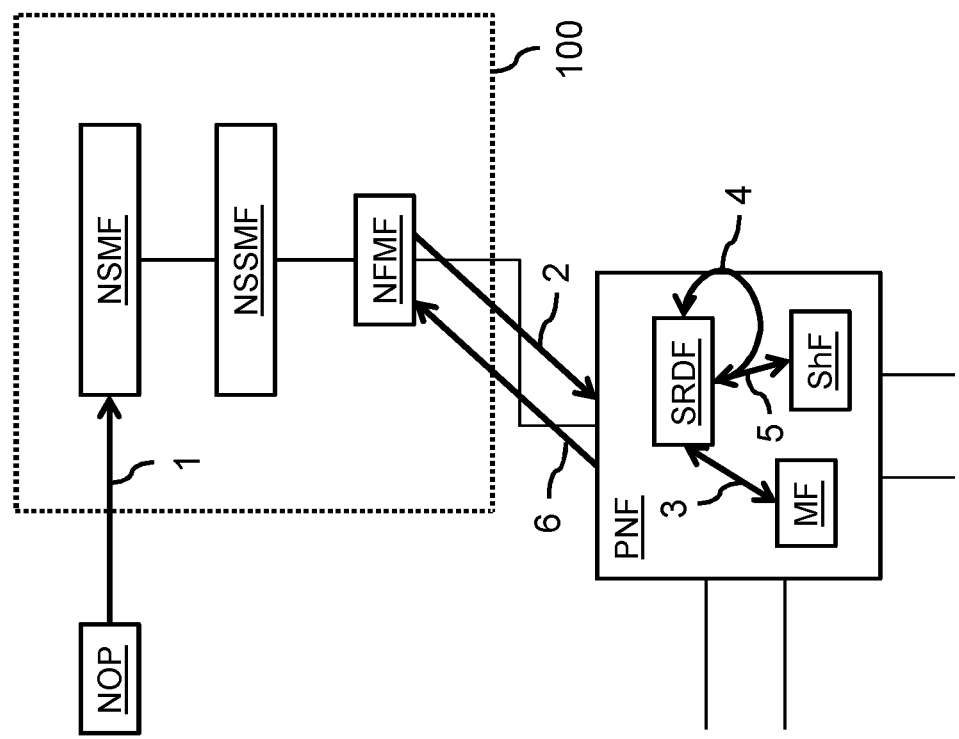
FIG. 3 shows the information flow of FIG. 2 and further shows the physical network function providing feedback to the slice management system.

FIG. 3 shows the information flow of FIG. 2 and further shows the physical network function PNF providing feedback to the slice management system 100 in a following step 6 by which the slice management system 100 may be informed about the shaping actions having been taken and/or a result of the shaping actions. For example, in step 6, the slice resource distribution function SRDF may send a resource reduction confirmation message to the slice management system 100 which may be indicative of the resource utilization by at least one network slice having been reduced. Based on this feedback, the slice management system 100 may for example decide to allocate another physical network function to a network slice, for example if it has been determined that problems in resource allocation continue to persist, or may decide to add a virtual network function to the network slice. If the network function of which the resource is being managed is a virtual network function, the slice management system 100 may also decide to allocate more resources to the virtual network function.

Figure 4:
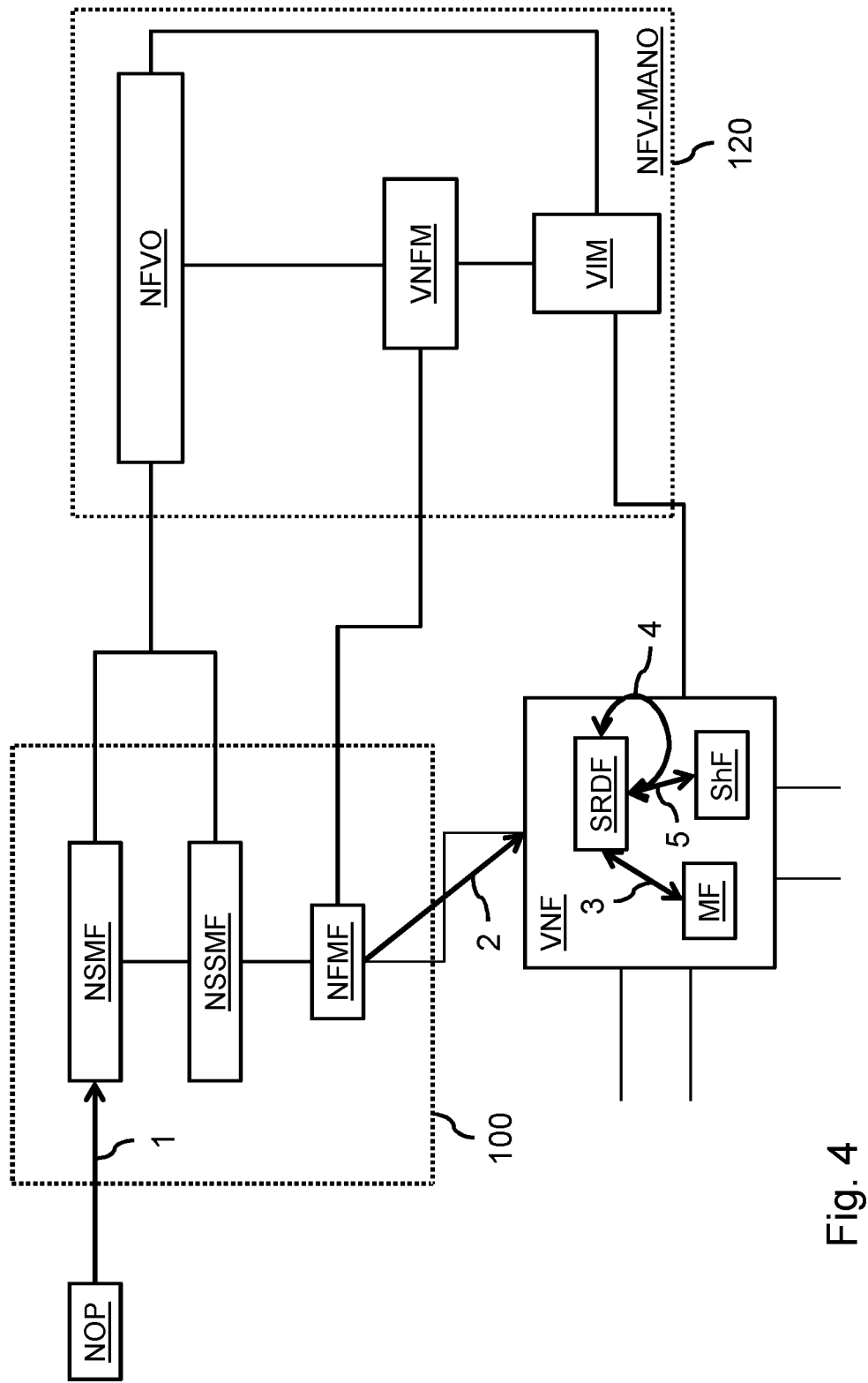
FIG. 4 shows an information flow between the network operator, the slice management system and the virtualized network function.

FIG. 4 shows an information flow between the network operator NOP, the slice management system 100 and a virtualized network function VNF which comprises a slice resource distribution function SRDF. The information flow may involve a same type of steps 1-5 as previously shown in and explained with reference to FIG. 2. It is noted that the resource capabilities of the virtualized network function VNF may be retrieved by the slice resource distribution function SRDF from the network function virtualization system 120. Accordingly, the slice resource distribution function SRDF may learn the maximum resource utilization level of the virtualized network function VNF from the network function virtualization system 120. It is further noted that, similarly to the example of FIG. 3, the virtualized network function VNF may provide feedback to the slice management system 100 in a step 6 (not shown in FIG. 4).

Figure 5:
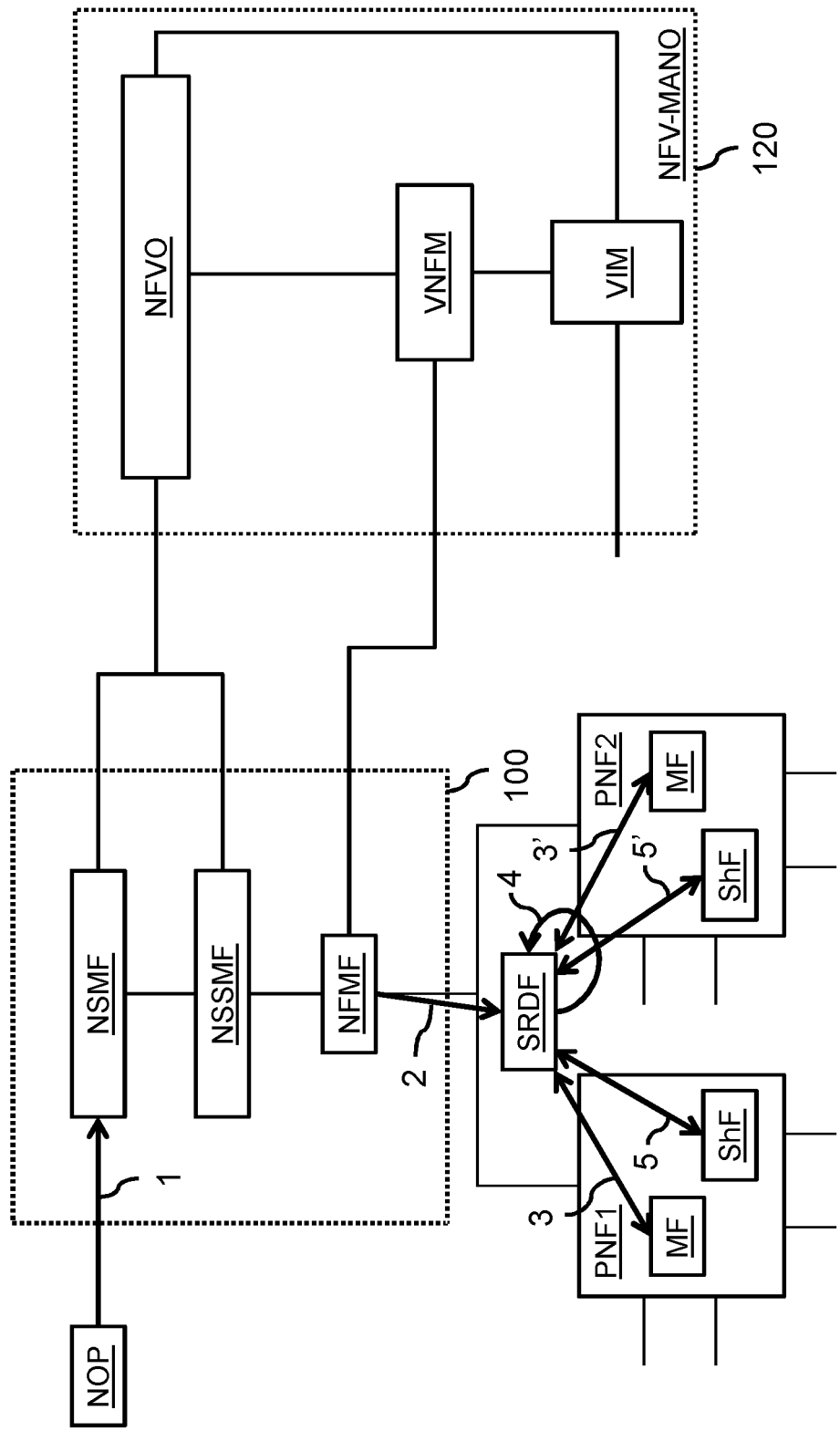
FIG. 5 shows an information flow between the network operator, the slice management system and a slice resource distribution function which is configured to manage the resource distribution of multiple network functions.

FIG. 5 shows an information flow between the network operator NOP, the slice management system 100 and a slice resource distribution function SRDF which may be configured to manage the resource distribution of multiple network functions, being in this example physical network functions PNF1, PNF2 but which may also be multiple virtual network functions or a combination of physical network functions and virtual network functions. Namely, in this example, the slice resource distribution function SRDF may not be implemented as part of a single physical or virtual network function of which a resource is utilized by the network slices, but as a separate shared network function. The shared slice resource distribution function SRDF may be configured to manage the resource distribution for multiple network functions on an individual basis, namely based on the aforementioned steps 1-5 which may be repeated for different network functions. This is also illustrated in FIG. 5, where for example steps 3 and 5 indicate steps applied with respect to PNF1 and steps 3' and 5' indicate corresponding steps applied with respect to PNF2. It will be appreciated that also steps 1, 2 and 4 may be performed for each network function individually but that such steps may also be shared between network functions, for example by obtaining configuration data which is indicative of the minimum guaranteed resource availability for all network slices which use the physical network functions PNF1, PNF2. It will be further appreciated that steps 3 and 5, which previously involved internal messages, may now involve the slice resource distribution function SRDF and a respective physical network function PNF1, PNF2 communicating via external messages.

Although not explicitly shown in FIG. 5, the slice resource distribution function SRDF may be configured to cross-correlate the resource utilization by network slices between the multiple network functions PNF1, PNF2 to identify of which network slice the resource utilization is to be reduced on the basis of the network slice being already limited in its resource utilization of a dependent resource of another network function. This way, the slice resource distribution function SRDF may throttle back resource utilization by one or more network slices in one network function if it can see that the resource capacity in another network function is a bottleneck for the resource utilization of said network slices(s). It will be appreciated that such bottlenecks may exist if for example the processing of one network function is dependent on a result of the processing of another network function, or if for example network traffic sent through one network function is then sent through another network function, etc.

Figure 6:
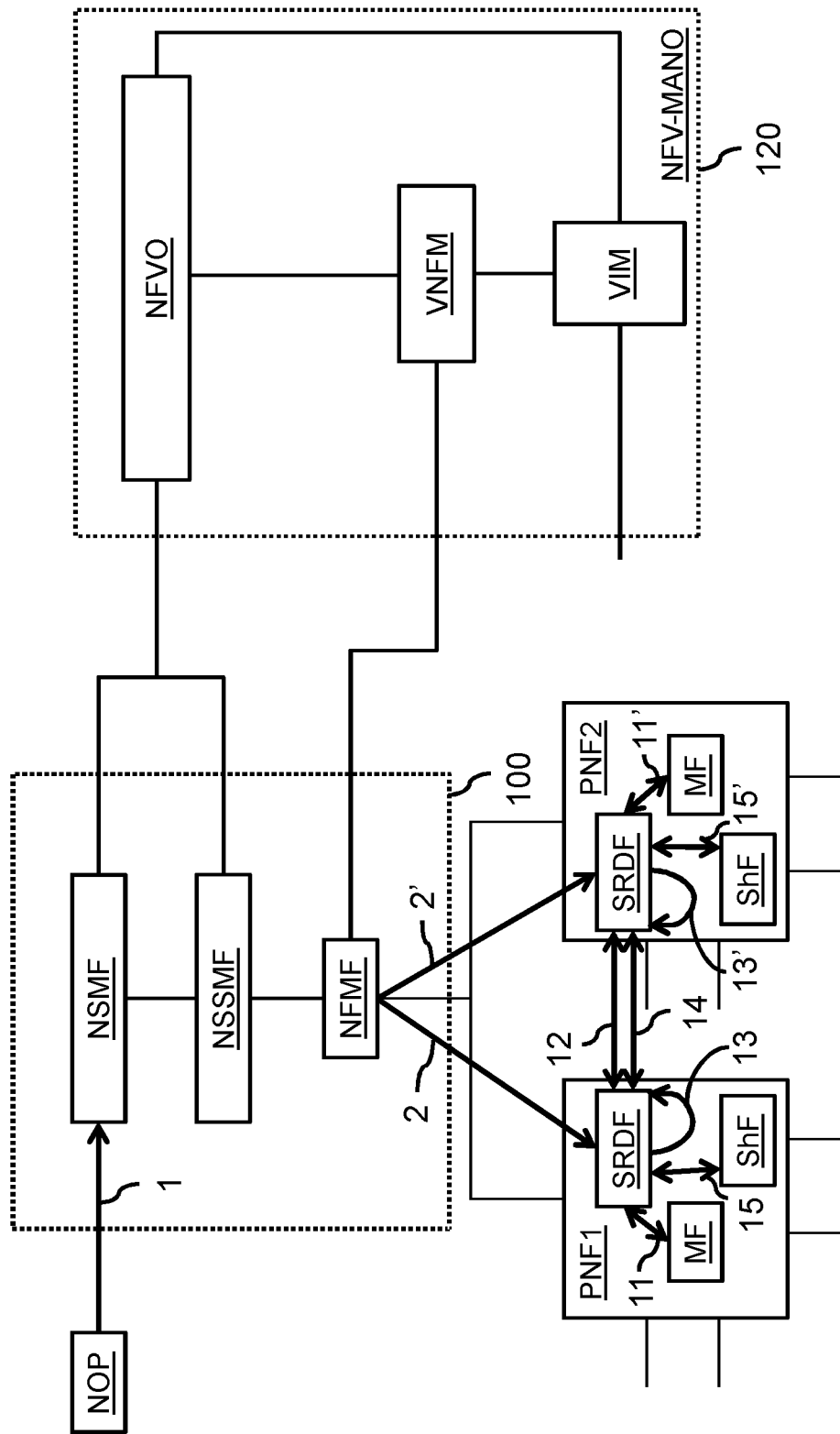
FIG. 6 shows an information flow between the network operator, the slice management system and multiple slice resource distribution functions which are configured to communicate with each other to share information.

FIG. 6 shows an information flow between the network operator NOP, the slice management system 100 and multiple slice resource distribution functions which may be configured to communicate with each other to share information. This example may be similar to the FIG. 5 example but with one of the differences being that instead of providing a shared slice resource distribution function SRDF, multiple slice resource distribution functions may be provided. In the example of FIG. 6, these multiple slice resource distribution functions may be provided as part of the respective physical network functions PNF1, PNF2 but which may also be multiple virtual network functions or a combination of physical network functions and virtual network functions. Here, steps 1 and 2 may correspond to previously described steps 1 and 2, while steps 2 and 2' may be a same type of step but performed for different network functions, e.g., involving providing the configuration data to the different physical network functions PNF1, PNF2. Moreover, steps 11 and 11' may correspond to steps 3 and 3', while step 12 may involve the slice resource distribution functions mutually sharing their resource utilization data. This may enable a respective slice resource distribution function, such as for example the slice resource distribution function SRDF of a first physical network function PNF1, to throttle back resource utilization by one or more network slices if the slice resource distribution function SRDF can see, on the basis of the exchanged resource utilization data, that the resource capacity in another network function PNF2 is a bottleneck for the resource utilization of said network slices(s). Steps 13 and 13' may correspond to the previously described step 4, while in step 14, the shaping actions which may have been decided by the respective slice resource distribution functions may be shared amongst each other, after which the shaping actions may be effected in steps 15 and 15', corresponding to the aforementioned steps 5 and 5'.

In general, the slice resource distribution function SRDF may also be referred to as a slice isolation function (SIF) on the basis of said function safeguarding minimum availability guarantees for network slices and thereby avoiding the resource utilization of one network slice being affected by the resource utilization of another network slice, or reducing the frequency or severity of such impact. This functionality may therefore establish a degree of isolation between the network slices. In general, the slice resource distribution function SRDF may be implemented as a subsystem of any existing network function in the user plane, such as a user plane function (UPF). The slice management system may configure the slice resource distribution function SRDF with the minimum availability guarantees given to respective network slices. Each network slice may be identified by an identifier, such as a S-NSSAI or slice-id.

In some embodiments, the measurement function MF and the shaping function ShF may operate on the basis of virtual networks, for example by the measurement function reporting the resource utilization of virtual networks and by the shaping function accepting instructions to shape the resource utilization of specific virtual networks. Accordingly, the resource utilization data, the resource reduction instruction message and other data and messages may list virtual network identifiers instead of (or in addition to) network slice identifiers. Nevertheless, the slice resource distribution function may communicate with the slice management system on the basis of network slices, e.g., by receiving configuration data which is indicative of, for each of the multiple network slices, a minimum guaranteed resource availability which is guaranteed to a respective network slice for utilization of the resource.

To enable the slice resource distribution function but also other functions to map such network slices to virtual networks and vice versa, the slice resource distribution function may make use of an interfacing system as described in the co-pending European patent application 19213388 which is hereby incorporated by reference in as far as being configured to provide a mapping between the network slices managed by the slice management system and the virtual networks of the network slice. Briefly speaking, the interfacing system may obtain identification data from a network virtualization system, such as the NFV-MANO as for example described by FIG. 5.1 and its corresponding description in [3], and may on the basis of the identification data be able to map network slices to virtual networks and vice versa. The slice resource distribution function may interact with the interfacing system, for example by receiving a list of virtual network identifiers which are associated with those network slices which utilize resources managed by the slice resource distribution function.

In a more specific example, based on service and/or operator requirements for the network slice (NS), the slice management system may create a network service description (NSD) for the network slice (NS), which may then be used by the NFV-MANO to create virtualized network functions (VNFs) and virtual networks that will be part of a NS instance (NSI) from the point of view of the slice management system. The interfacing system may be configured to communicate with the slice management system and the network virtualization system. In particular, the interfacing system may be configured to obtain identification data from the network virtualization system, wherein the identification data identifies, for at least one network slice, which one or more virtual networks are comprised in the respective network slice. The interfacing system may then make this identification data available to the slice resource distribution function or in any other way enable the slice resource distribution function to obtain a mapping between network slices and virtual networks contained therein.

Figure 7:
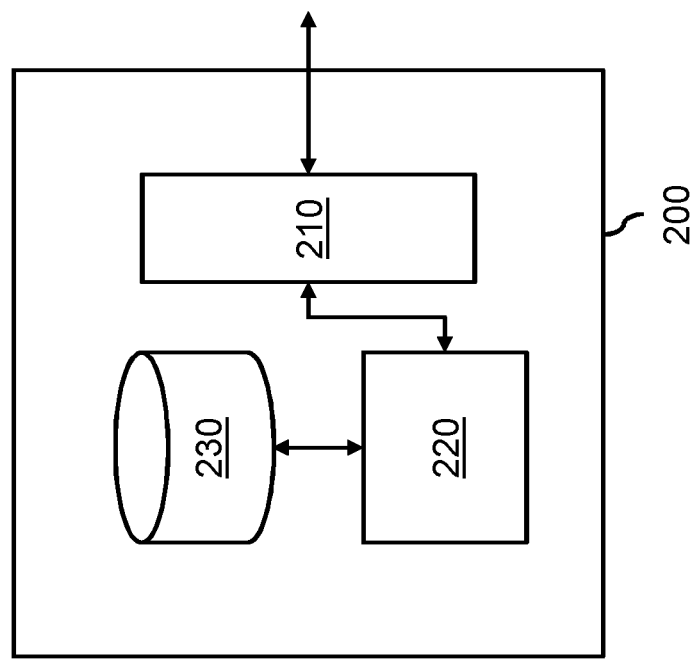
FIG. 7 shows a system configured as the slice resource distribution function comprising a communication interface, a processor subsystem and a data storage.

FIG. 7 shows a system 200 comprising a communication interface 210, a processor subsystem 220 and a data storage 230. The system 200 may represent any individual system as described in this specification, including but not limited to a system configured as the slice resource distribution function and a system configured as physical or virtual network function which comprises the slice resource distribution function. The communication interface 210 may be used by the system 200 to communicate with other entities. In some examples, the communication interface 210 may comprise or consist of a network interface, e.g., a wired network interface based on Ethernet or optical fiber or a wireless network interface such as a microwave or satellite communication interface. In other examples, the communication interface 210 may comprise several network interfaces, for example to communicate via a different networks or different network segments with different entities. Each of the network interfaces may be of a type as described above. In yet other examples, the communication interface 210 may comprise an internal communication interface, for example in cases where the system 200 is integrated into another system. Such an internal communication interface may be a software interface, e.g., based on an application programming interface (API). In such examples, the communication interface 210 may further comprise a network interface for external communication. It is noted that each communication interface may be a physical interface, e.g., connected to a physical medium, but also a logical interface, e.g., defined by software.

The processor subsystem 220 of the system 200 may be configured, e.g., by hardware design or software, to perform the operations described in this specification in as far as pertaining to the system configured as the slice resource distribution function and/or the system configured as physical or virtual network function which comprises the slice resource distribution function. For example, the processor subsystem 220 may be embodied by a single Central Processing Unit (CPU), but also by a combination or system of such CPUs and/or other types of processing units. In general, the system 200 may be embodied by a (single) device or apparatus, e.g., a network server. However, the system 200 may also be embodied by a distributed system of such devices or apparatuses, e.g., a distributed system of network servers. In such cases, the processor subsystem 220 may also be a distributed system of processors, e.g., of CPUs and/or other types of processing units.

FIG. 7 further shows the system 200 to comprise a data storage 230, such as a hard disk, a solid-state drive or an array of hard disks or an array of solid-state drives, which may be used by the system 200 for storing data. For example, the system 200 may as slice resource distribution function store configuration data received from the slice management system, resource utilization data received from measurement functions, slice-to-virtual network mappings received from the interfacing system, etc.

In general, the system 200 may be implemented at least in part by a device or apparatus. The device or apparatus may comprise one or more (micro)processors which execute appropriate software. Software implementing the functionality of the function(s) may have been downloaded and/or stored in a corresponding memory or memories, e.g., in volatile memory such as RAM or in non-volatile memory such as Flash. Alternatively, the function(s) of the system 200 may be implemented in the device or apparatus in the form of programmable logic, e.g., as a Field-Programmable Gate Array (FPGA). In general, each function may be implemented as a circuit.

Figure 8:
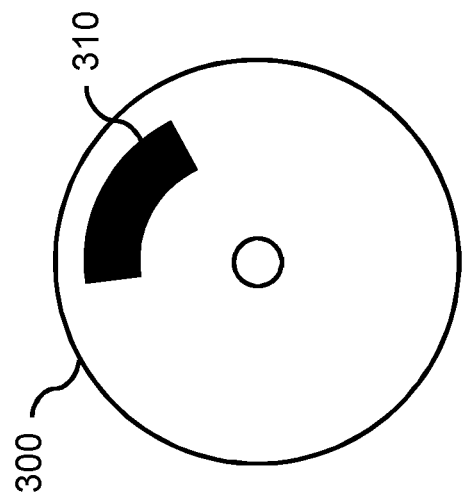
FIG. 8 shows a computer-readable medium comprising data.

It is noted that any of the methods described in this specification, for example in any of the claims, may be implemented on a computer as a computer-implemented method, as dedicated hardware, or as a combination of both. Instructions for the computer, e.g., executable code, may be stored on a computer-readable medium 300 as for example shown in FIG. 8, e.g., in the form of a series 310 of machine-readable physical marks and/or as a series of elements having different electrical, e.g., magnetic, or optical properties or values. The executable code may be stored in a transitory or non-transitory manner. Examples of computer-readable mediums include memory devices, optical storage devices, integrated circuits, servers, online software, etc. FIG. 8 shows by way of example an optical storage device 300.

Figure 9:
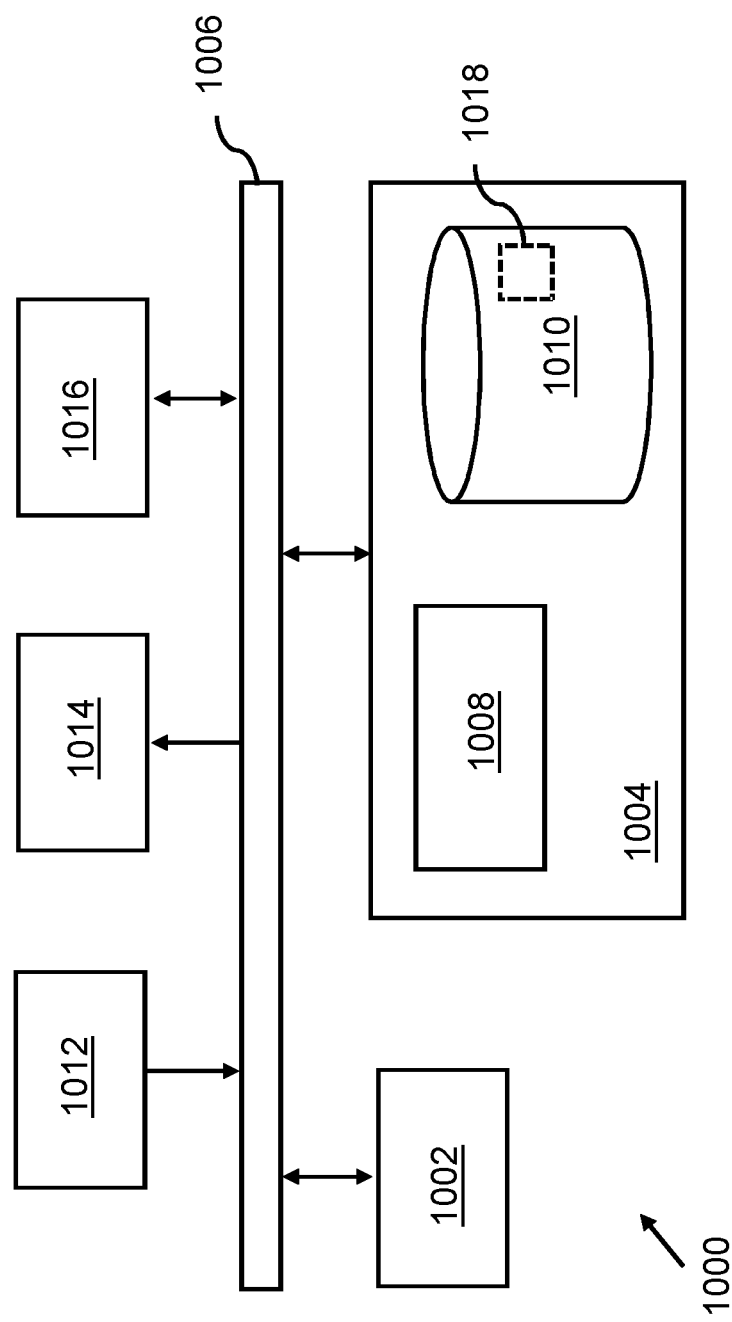
FIG. 9 shows an exemplary data processing system.

FIG. 9 is a block diagram illustrating an exemplary data processing system that may be used in the embodiments described in this specification. Such data processing systems include data processing entities described in this specification, including but not limited to the system configured as the slice resource distribution function and the system configured as physical or virtual network function comprising the slice resource distribution function. The data processing system 1000 may include at least one processor 1002 coupled to memory elements 1004 through a system bus 1006. As such, the data processing system may store program code within memory elements 1004. Further, processor 1002 may execute the program code accessed from memory elements 1004 via system bus 1006. In one aspect, data processing system may be implemented as a computer that is suitable for storing and/or executing program code. It should be appreciated, however, that data processing system 1000 may be implemented in the form of any system including a processor and memory that is capable of performing the functions described within this specification.

Memory elements 1004 may include one or more physical memory devices such as, for example, local memory 1008 and one or more bulk storage devices 1010. Local memory may refer to random access memory or other non-persistent memory device(s) generally used during actual execution of the program code. A bulk storage device may be implemented as a hard drive, solid state disk or other persistent data storage device. The processing system 1000 may also include one or more cache memories (not shown) that provide temporary storage of at least some program code in order to reduce the number of times program code must be retrieved from bulk storage device 1010 during execution.

Input/output (I/O) devices depicted as input device 1012 and output device 1014 optionally can be coupled to the data processing system. Examples of input devices may include, but are not limited to, for example, a microphone, a keyboard, a pointing device such as a mouse or the like. Examples of output devices may include, but are not limited to, for example, a monitor or display, speakers, or the like. Input device and/or output device may be coupled to data processing system either directly or through intervening I/O controllers. A network adapter 1016 may also be coupled to data processing system to enable it to become coupled to other systems, computer systems, remote network devices, and/or remote storage devices through intervening private or public networks. The network adapter may comprise a data receiver for receiving data that is transmitted by said systems, devices and/or networks to said data and a data transmitter for transmitting data to said systems, devices and/or networks. Modems, cable modems, and Ethernet cards are examples of different types of network adapter that may be used with data processing system 1000.

As shown in FIG. 9, memory elements 1004 may store an application 1018. It should be appreciated that data processing system 1000 may further execute an operating system (not shown) that can facilitate execution of the application. The application, being implemented in the form of executable program code, can be executed by data processing system 1000, e.g., by processor 1002. Responsive to executing the application, the data processing system may be configured to perform one or more operations to be described herein in further detail.

In one aspect, for example, data processing system 1000 may implement a system configured as slice resource distribution function. In that case, application 1018 may represent an application that, when executed, configures data processing system 1000 to perform the functions described herein with reference to the slice resource distribution function. In another aspect, data processing system 1000 may implement a system configured as physical or virtual network function and which comprises the system configured as slice resource distribution function. In that case, application 1018 may represent an application that, when executed, configures data processing system 1000 to perform the functions described herein with reference to the physical or virtual network function and the slice resource distribution function.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or stages other than those stated in a claim. The article "a" or "an" preceding an element does not exclude the presence of a plurality of such elements. Expressions such as "at least one of" when preceding a list or group of elements represent a selection of all or of any subset of elements from the list or group. For example, the expression, "at least one of A, B, and C" should be understood as including only A, only B, only C, both A and B, both A and C, both B and C, or all of A, B, and C. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

What is claimed is:

1. A system configured as a slice resource distribution function of a network function in a network, wherein the network supports instantiation of network slices which each comprise one or more virtual networks, wherein the system comprises:
   a communication interface to the network function having a resource which is utilizable by multiple network slices and shared amongst the multiple network slices;
   a processor subsystem configured to:
   receive configuration data which is indicative of, for each of the multiple network slices, a minimum guaranteed resource availability which is guaranteed to a respective network slice for utilization of the resource;
   and to manage a resource utilization of the resource by:
   aggregating a current resource utilization by each of the multiple network slices to determine an overall resource utilization of the resource;
   if the overall resource utilization is within a range of a maximum resource utilization level of the resource, reducing the resource utilization of at least one of the multiple network slices of which the resource utilization exceeds the minimum guaranteed resource availability guaranteed to the respective network slice;
   wherein the network function is a virtual network function or a physical network function, providing a bandwidth, a switching capacity, a computing capacity, and/or a storage capacity.

2. The system according to claim 1, wherein the network comprises a slice management system for management of the multiple network slices, and wherein the processor subsystem is configured to:
   receive the configuration data from the slice management system.

3. The system according to claim 2, wherein the processor subsystem is configured to:
   send a resource reduction confirmation message to the slice management system, wherein the resource reduction confirmation message is indicative of the resource utilization by the at least one of the multiple network slices having been reduced.

4. The system according to claim 1, wherein the network function comprises a measurement function for determining the resource utilization of the resource of the network function, wherein the processor subsystem is configured to:
   receive resource utilization data from the measurement function, wherein the resource utilization data is indicative of the resource utilization by each of the multiple network slices.

5. The system according to claim 4, wherein the configuration data comprises virtual network identifiers of the respective virtual networks of the multiple network slices, and wherein the resource utilization data is indicative of the resource utilization per virtual network by linking a determined resource utilization to a respective virtual network identifier.

6. The system according to claim 4, wherein the processor subsystem is configured to:
   send a measurement instruction message to the measurement function to instruct the measurement function to determine the resource utilization by the multiple network slices, wherein the measurement instruction message comprises the virtual network identifiers of the respective virtual networks of the multiple network slices.

7. The system according to claim 1, wherein the virtual network function is instantiated by a network function virtualization system of the network.

8. The system according to claim 1, wherein the physical network function is a switch or a router or a physical server.

9. The system according to claim 1, wherein the network function comprises a resource reduction function for reducing the resource utilization of the resource, wherein the processor subsystem is configured to:
send a resource reduction instruction message to the resource reduction function to instruct the resource reduction function to reduce the resource utilization by the at least one of the multiple network slices of which the resource utilization exceeds the minimum guaranteed resource availability.

10. The system according to claim 1, wherein the processor subsystem is configured to manage the resource utilization for multiple network functions by:
determining a respective overall resource utilization of a respective resource of each one of the multiple network functions; and
reducing or redistributing the overall resource utilization of at least one of the network functions if the overall resource utilization of the resource of said network function is within a range of a maximum resource utilization level of said resource.

11. The system according to claim 10, wherein the processor subsystem is configured to cross-correlate the resource utilization by network slices between the multiple network functions to identify of which network slice the resource utilization is to be reduced on the basis of the network slice being already limited in its resource utilization of a dependent resource of another network function.

12. The system according to claim 1, wherein the resource utilization of the resource which is managed by the system is at least one of:
a utilization of a bandwidth of the network function which is available for the transporting traffic of the multiple network slices;
a utilization of a switching capacity of the network function which is available for switching traffic of the multiple network slices;
a utilization of a computing capacity of the network function which is available for use by applications of the multiple network slices;
a utilization of a storage capacity of the network function which is available for use by applications of the multiple network slices.

13. A system representing a network function having a resource which is utilizable by multiple network slices and shared amongst the multiple network slices, the network function comprising the system according to claim 1 as a subsystem.

14. A computer-implemented method for providing slice resource distribution functionality in a network, wherein the network supports instantiation of network slices which each comprise one or more virtual networks, wherein the network comprises a network function having a resource which is utilizable by multiple network slices and shared amongst the multiple network slices, wherein the method comprises:
receiving configuration data which is indicative of, for each of the multiple network slices, a minimum guaranteed resource availability which is guaranteed to a respective network slice for utilization of the resource;
and managing a resource utilization of the resource by:
aggregating a current resource utilization by each of the multiple network slices to determine an overall resource utilization of the resource;
if the overall resource utilization is within a range of a maximum resource utilization level of the resource, reducing the resource utilization of at least one of the multiple network slices of which the resource utilization exceeds the minimum guaranteed resource availability guaranteed to the respective network slice;
wherein the network function is a virtual network function or a physical network function, providing a bandwidth, a switching capacity, a computing capacity, and/or a storage capacity.

15. A computer-readable medium comprising transitory or non-transitory data representing a computer program, the computer program comprising instructions for causing a processor system to perform the method according to claim 14.

* * * * *